(12) United States Patent
Korba et al.

(10) Patent No.: US 9,514,561 B2
(45) Date of Patent: Dec. 6, 2016

(54) METHOD AND DEVICE FOR DISPLAYING CHANGED SHAPE OF PAGE

(71) Applicant: SAMSUNG ELECTRONICS CO., LTD., Suwon-si (KR)

(72) Inventors: Dmitro Korba, Zinkiv (UA); Yuriy Polyulya, Kyiv (UA); Andriy Fisunenko, Kyiv (UA); Ievgen Liashchenko, Kherson (UA); Valentyn Kulikovskyi, Kyiv (UA); Yevgeniy Volkov, Kyiv (UA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 153 days.

(21) Appl. No.: 14/244,331

(22) Filed: Apr. 3, 2014

(65) Prior Publication Data
US 2014/0347369 A1   Nov. 27, 2014

(30) Foreign Application Priority Data

May 22, 2013   (KR) .................. 10-2013-0057956

(51) Int. Cl.
| | | |
|---|---|---|
| G06F 3/0483 | (2013.01) | |
| G06T 13/20 | (2011.01) | |
| G06F 3/041 | (2006.01) | |
| G06F 3/0488 | (2013.01) | |
| G06T 17/20 | (2006.01) | |

(52) U.S. Cl.
CPC ............ G06T 13/20 (2013.01); G06F 3/0416 (2013.01); G06F 3/0483 (2013.01); G06F 3/04883 (2013.01); G06T 17/20 (2013.01)

(58) Field of Classification Search
None
See application file for complete search history.

(56) References Cited

U.S. PATENT DOCUMENTS

| | | |
|---|---|---|
| 7,091,977 B2 | 8/2006 | Jeong et al. |
| 7,898,541 B2 | 3/2011 | Hong et al. |
| 2010/0175018 A1 | 7/2010 | Petschnigg et al. |
| 2012/0096374 A1* | 4/2012 | Leskela ............... G06F 3/04883 715/764 |

OTHER PUBLICATIONS

Witten et al., "Compuer Graphics Techniques for Modeling Page Turning," Springer-Verlag, Sep. 26, 2009.*
Zhou et al., "Plausible Cloth Animations Using Dyanamic Bending Model," National natural Science Foundation of China, 2008.*

* cited by examiner

*Primary Examiner* — Kee M Tung
*Assistant Examiner* — Nicholas R Wilson
(74) *Attorney, Agent, or Firm* — Sughrue Mion, PLLC

(57) ABSTRACT

Exemplary embodiments disclose a method and device for displaying a changed shape of a page. The method includes: receiving a user touch input on the page; calculating a virtual touch force which acts on a first node on the page based on the user touch input; calculating a virtual spring force which acts on the first node by at least one virtual spring which is connected to the first node based on the calculated virtual touch force; calculating a virtual rod force which acts on the first node by at least one virtual rod which is connected to the first node based on the calculated virtual touch force; and moving the first node based on the virtual touch force, the virtual spring force and the virtual rod force.

23 Claims, 13 Drawing Sheets

METHOD AND DEVICE FOR DISPLAYING CHANGED SHAPE OF PAGE

RELATED APPLICATIONS

This application claims priority from Korean Patent Application No. 10-2013-0057956, filed on May 22, 2013, in the Korean Intellectual Property Office, the disclosure of which is incorporated herein by reference in its entirety.

BACKGROUND

1. Field

Exemplary embodiments relate to displaying a changed shape of a page displayed on a screen. In particular, exemplary embodiments relate to a method and device for providing an image effect of turning over a page according to a user input.

2. Description of the Related Art

In a related art, methods and devices that allow a user to read a book on a screen of a device are becoming more prevalent. In addition, when a user reads a book on a device, an effect of turning over pages of the book on a screen of a device may be provided. However, only a related art technique, which provides an image effect of turning over a page, according to a predefined manner when a user input is received for turning over the page, has become prevalent. Thus, a technique which provides various image effects of turning over a page according to a user input is required.

SUMMARY

Exemplary embodiments may provide a more realistic page turn-over effect.

Exemplary embodiments may include a non-transitory computer-readable storage medium having stored therein program instructions, which when executed by a computer, perform a method of displaying a changed shape of a page.

Additional aspects will be set forth in part in the description which follows and, in part, will be apparent from the description, or may be learned by practice of the presented embodiments.

According to an aspect of an exemplary embodiment, a method of providing a changed screen by displaying a changed shape of a page displayed on a screen of a device includes: receiving a user touch input on the page; calculating a virtual touch force which acts on a first node on the page based on the user touch input; calculating a virtual spring force which acts on the first node by at least one virtual spring which is connected to the first node based on the calculated virtual touch force; calculating a virtual rod force which acts on the first node by at least one virtual rod which is connected to the first node based on the calculated virtual touch force; and moving the first node based on the virtual touch force, the virtual spring force and the virtual rod force.

The method may further include calculating virtual gravity which acts on the first node, wherein the moving the first node includes moving the first node based on the virtual touch force, the virtual spring force, the virtual rod force, and the virtual gravity.

The method may further include calculating a virtual resisting force which acts on the first node, wherein the moving the first node includes moving the first node based on the virtual touch force, the virtual spring force, the virtual rod force, the virtual gravity, and the virtual resisting force.

The moving the first node may include determining a moving direction and a moving speed of the first node based on a sum of the virtual touch force, the virtual spring force, the virtual rod force, the virtual gravity, and the virtual resisting force.

The calculating the virtual resisting force which acts on the first node may include calculating the virtual resisting force based on a virtual resisting force coefficient and a moving speed of the first node.

The moving speed of the first node may decrease according to time.

The page may include a plurality of rectangles, the rectangles may be disposed to cover the entire surface of the page without overlapping each other, and the first node may be one of a plurality of apexes in the rectangles.

The first node may be an apex, which is closest to a point touched by the user, from among the apexes of the rectangles.

The virtual spring force may be a virtual force which acts on the first node by a plurality of virtual springs which connect the first node to a respective plurality of nodes which are adjacent to the first node.

The at least one virtual rod may include a vertical rod and a horizontal rod, the vertical rod may be virtually connected to three adjacent nodes in a vertical direction of the page, and the horizontal rod may be virtually connected to three adjacent nodes in a horizontal direction of the page.

A portion of the virtual touch force, the virtual spring force, and the virtual rod force, which act on the first node, may act on nodes which are adjacent to the first node.

The method may further include providing a new screen by giving a predetermined influence to all the nodes according to the movement of the first node.

The new screen may be smoothly displayed according to a predetermined criterion.

The user touch input may be two or more in number which are simultaneously input.

According to another aspect of an exemplary embodiment, a method of displaying a changed shape of a page displayed on a screen of a device includes: calculating a virtual resisting force which acts on a first node of the page based on at least one of a virtual resisting coefficient and a moving speed of the first node; calculating a net virtual force which acts on the first node by obtaining a vector sum of a plurality of virtual forces which act on the first node; and determining a speed magnitude and a direction of the first node using the calculated virtual resisting force and the calculating net virtual force. The plurality of virtual forces include at least one of a virtual touch force, a virtual spring force, and a virtual rod force, in addition to the virtual resisting force.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
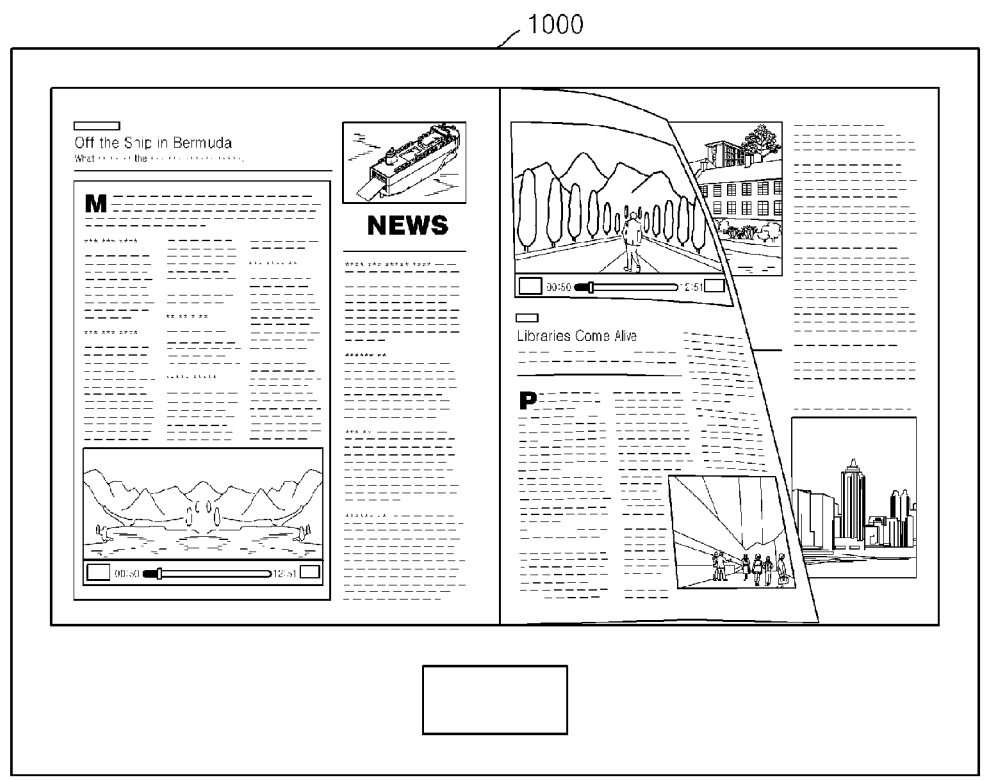
FIG. 1 is a diagram for describing a method of displaying a changed shape of a page displayed on a screen of a device, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

When a certain part "includes" a certain component, this indicates that the part may further include another component, instead of excluding another component, unless there is a different disclosure.

In addition, in the exemplary embodiments, a touch input may be an input to a device 1000 by a user touching a screen of the device 1000. When the user touches a touch screen with a certain object (e.g., a stylus pen) or a body part of the user (e.g., a finger) within a predetermined distance from the touch screen, information related to a location of the touch input may be collected by the device 1000. In addition, a touch input may not be limited to a specific part on the screen. A device may recognize an input only at lower parts of both ends of a page in the related art. However, according to the exemplary embodiments, the device 1000 may receive at least one touch input on the entire area of the screen thereof. The device 1000 may receive two or more touch inputs at the same time. Thus, while one touch input is received and is being maintained, another touch input may be received. In addition, a touch input may be a continuous motion of at least one touch.

In addition, in the exemplary embodiments, a touch direction may be in a direction from a first location of a touch input to a next location of the touch input when a location of the touch input is changed in a state where the touch input exists and is maintained.

In addition, in the exemplary embodiments, a touch speed may be an amount of change in a location of a touch input per hour when a location of the touch input is changed in a state where the touch input exists and is maintained.

In addition, in the exemplary embodiments, a touch pressure may be pressure acting on a screen by a touch input when the touch input exists. In particular, the touch pressure may be a force acting in a direction of the screen from the outside of the screen when the touch input exists. In addition, the touch pressure may be determined using a pressure sensor. In this case, the pressure sensor may be located below the screen of the device 1000.

In addition, in the exemplary embodiments, a touch force may be a virtual force acting on a page displayed on the screen of the device 1000 by a user touch input. When a location of a touch is changed in a state where the device 1000 is touched by the user and the touch is maintained, a virtual force, acting on a page displayed on the screen of the device 1000 by considering a touch pressure, a touch direction, a touch speed, and a moving distance of the touched part, may be a touch force.

In addition, in the exemplary embodiments, a spring force may be a virtual force acting on nodes by a virtual spring between the nodes to which the virtual spring is connected. The spring force may act on nodes connected to a virtual spring on a page in a direction for maintaining a distance between the nodes constant.

In addition, in the exemplary embodiments, a rod force may be a virtual force acting on nodes by a virtual rod connected to two or more nodes on a page. The rod force may act on nodes in a direction for maintaining a node arrangement state when nodes are adjacently arranged. The rod force may act between all the nodes linearly arranged on a page or act on some of all the nodes linearly arranged on the page. However, the rod force is not limited thereto, and the rod force may act between nonlinearly arranged nodes.

In addition, according to an embodiment, the device 1000 may provide various image effects to a page displayed thereon for viewing. The various image effects to the page displayed may simulate the page being physically turned over in the real world by calculating a virtual force acting on nodes on the page displayed thereon.

In addition, in the exemplary embodiment, "page turn-over vertical axis" may indicate a line, which becomes an axis when a page is turned over, as a part that is not freely movable from among vertical lines at both ends of the page. A part that is not the page turn-over vertical axis and is freely movable from among the vertical lines at the both ends of the page may be "page movement vertical line". For example, referring to FIG. 5, reference numerals 510, 530, and 540 may indicate page movement vertical lines, and reference numeral 520 may indicate a page turn-over vertical axis.

Hereinafter, exemplary embodiments will be described in detail with reference to the accompanying drawings.

FIG. 1 is a diagram for describing a method of displaying a changed shape of a page displayed on a screen of the device 1000, according to an embodiment.

A user may display a changed shape of a page displayed on the screen through a touch at any location of the screen. The user may experience an effect simulating a page being turned over through the device 1000. However, a simulation may vary according to a detailed implementing method. In particular, various different image effects may be provided according to a location of a touch input, a touch direction, a touch motion, and a touch speed.

According to an embodiment, the device 1000 may move a first node displayed on the screen thereof based on a touch force, a spring force, a rod force, and gravity, and determine a moving direction and a moving speed of the first node. In addition, the device 1000 may consider a resisting force to move the first node.

Figure 2:
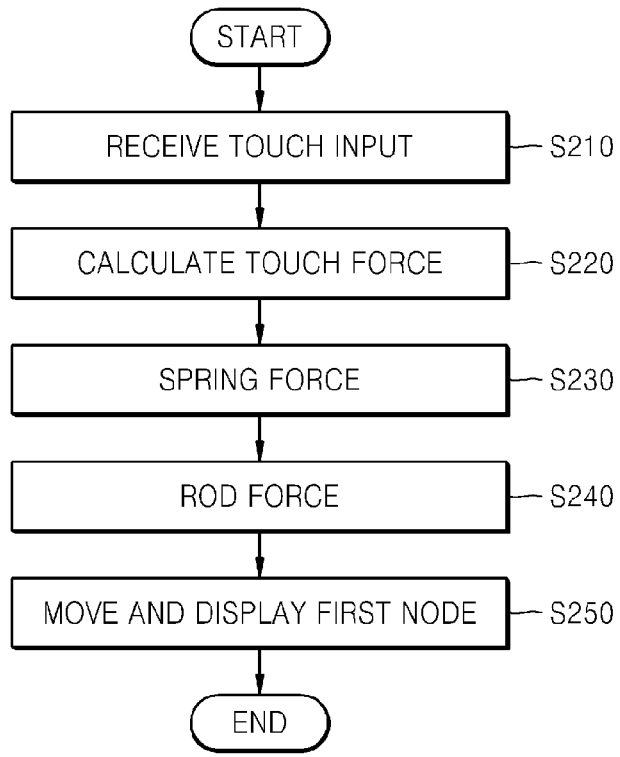
FIG. 2 is a flowchart illustrating a method of displaying a changed shape of a page displayed on a screen of a device by calculating a touch force, a spring force, and a rod force, according to an embodiment.

FIG. 2 is a flowchart illustrating a method of displaying a changed shape of a page displayed on a screen of the device 1000 by calculating a touch force, a spring force, and a rod force, according to an embodiment. In operation S210, the device 1000 receives a user touch input on the screen thereof. The touch input may be a pressure applied to the device 1000 by the user touching the screen of the device 1000. In particular, when the user touches a touch screen with a certain object (e.g., a stylus pen) or a body part of the user (e.g., a finger) within a predetermined distance from the touch screen, information related to a location of the touch input may be collected by the device 1000.

In operation S220, the device 1000 calculates a touch force on a page displayed on the screen of the device 1000 by the user touch input. In operation S220, the touch force may be calculated by considering a touch pressure, a touch direction, a touch speed, a moving distance of a touched part based on the touch input received in operation S210.

In operation S230, the device 1000 calculates a spring force for nodes on the page.

When a spring is connected between two certain points in the real world, a force may act in a direction for maintaining a distance between the two points constant. The spring force may provide a similar effect on a screen. In more particular, when the spring force acts between two nodes on a certain screen, a virtual force may act between the two nodes in a direction for maintaining a distance between the two nodes constant. An element for allowing the same effect as the spring in the real world to be exhibited on a screen may be a virtual spring connected between the two nodes. A force generated by the virtual spring may be the spring force. The spring force may act between the two nodes to which the virtual spring is connected. The spring force may be generated when a touch force exists. In a no moving state, nodes may not move since spring forces are mutually offset. An elastic coefficient of the virtual spring may be set in advance.

Determining locations of nodes is described below with reference to FIG. 6. In addition, each of the nodes may be connected to neighboring nodes thereof by a virtual spring.

A spring force acting on two nodes connected to an arbitrary virtual spring may be proportional to an amount of change in a distance between the two nodes. When it is assumed that $F_{spring}$ denotes a spring force, $k_{spring}$ denotes an elastic coefficient of a virtual spring, $\Delta x$ denotes an amount of change in a length of the virtual spring, $x_{current}$ denotes a current length of the virtual spring, and $x_0$ denotes a length of the virtual spring in a state where no force is applied, the spring force may be determined so as to satisfy the equation $F_{spring}=k_{spring}\cdot\Delta x=k_{spring}\cdot(x_{current}-x_0)$. It may be considered that a value of $F_{spring}$ that is greater than 0 indicates a state where a spring is extended, and a value of $F_{spring}$ that is less than 0 indicates a state where the spring is compressed. However, a value accurately satisfying the equation is not necessarily required, and each value may be determined as an approximate value.

In operation S240, the device 1000 calculates a rod force.

When a rod is connected to three or more objects in the real world, a force may act on each object in a direction where the rod is not bent. Alternatively, a force may act on each object in a direction where a curve connecting the three or more objects maintains a constant curve factor. The rod force may provide a similar effect on a screen. In particular, when the rod force acts on nodes on a certain screen, a virtual force may act on the nodes in a direction where a corresponding virtual rod is not bent. A virtual rod may have a same effect as a rod in the real world to be exhibited on a screen. A force generated by the virtual rod may be the rod force. The rod force may act on rods connected to the virtual rod. The rod force may be generated when a touch force exists. In a no moving state, nodes may not move since rod forces are mutually offset or do not act. An elastic coefficient of the virtual rod may be set in advance.

The virtual rod may be connected to three or more neighboring nodes.

When the virtual rod is connected to three or more nodes in a direct line, if a touch force acts on the virtual rod, the rod force may act in a direction for forcing the nodes connected to the virtual rod to be in the direct line.

In operation S250, the device 1000 moves and displays a first node. The first node may be an arbitrary one of the nodes on the screen of the device 1000. In addition, the first node may move on the screen by a touch input. A location of the first node moved by the touch input may be determined based on the touch force calculated in operation S220, the spring force calculated in operation S230, and the rod force calculated in operation S240.

Figure 3:
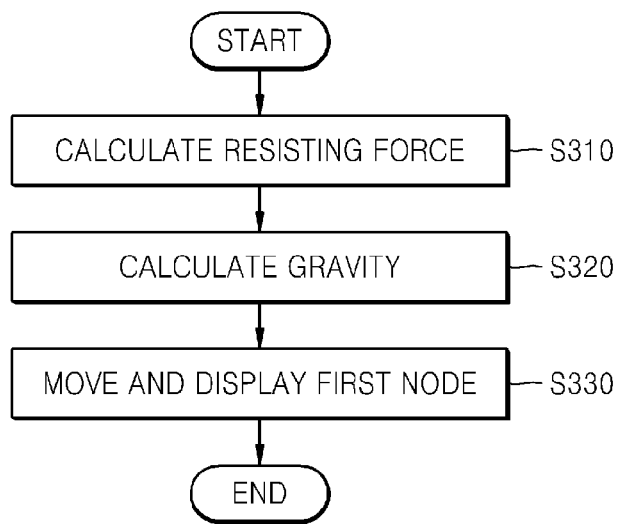
FIG. 3 is a flowchart illustrating a method of calculating a resisting force and gravity and displaying a changed shape of a page displayed on a screen of a device by considering the calculated resisting force and gravity, according to an embodiment.

FIG. 3 is a flowchart illustrating a method of calculating a resisting force and gravity and displaying a changed shape of a page displayed on a screen of the device 1000 by considering the calculated resisting force and gravity, according to an embodiment.

In operation S310, the device 1000 calculates a resisting force. The resisting force may be a virtual force acting in a direction obstructing the movement of a corresponding node. In the real world, an example of the resisting force may be the resistance of the air. When a certain object moves in the real world, the resistance of the air may act in a direction obstructing the movement of the certain object. An element exhibiting such an effect on the screen may be the resisting force.

When a location of a node is differently displayed on the screen according to time, the node looks like the node is moving, and the movement of the node may indicate a change in a location of the node according to time. In other words, the resisting force may be a virtual force acting in a direction obstructing a change in a location of a corresponding node according to time.

The resisting force virtually acting on a node may be calculated by considering a moving speed of the node. In addition, the resisting force may be calculated by considering a coefficient of the resisting force.

In particular, the resisting force may be calculated as a value that is proportional to a square of a moving speed of a node. Alternatively, the resisting force may be calculated as a value that is proportional to a moving speed of a node. If it is assumed that $\overline{V}$ denotes a moving speed of a node, $$k_{energy \atop loss}$$

denotes a coefficient of a resisting force, and $\overline{F}_{loss}^{energy}$ denotes the resisting force, the moving speed of the node, the coefficient of the resisting force, and the resisting force may be determined to satisfy the equation $$\overline{F}_{loss}^{energy} = k_{energy \atop loss} \cdot \overline{V} \text{ or } \overline{F}_{loss}^{energy} = k_{energy \atop loss} \cdot \overline{V}^2.$$

However, this equation is an approximation, and in the exemplary embodiments, the resisting force, the moving speed of the node, and the coefficient of the resisting force do not have to have exact values which satisfy the above equation. The coefficient of the resisting force may be set in advance.

In operation S320, the device 1000 calculates gravity, which is a virtual force acting on a node. In addition, gravity may act in a direction of the center of the earth. In other words, gravity may indicate a virtual force acting on the screen in a direction corresponding to a direction of gravity in the real world by checking the direction of gravity in the real world on the device 1000. However, the direction of the virtual force may not be the same as the direction of gravity in the real world. A virtual mass may be set in advance to each node. Gravity may be calculated based on the virtual mass preset to each node. If it is assumed that $M_n$ denotes a virtual mass preset to each node, $g_n$ denotes a virtual acceleration of gravity, and $F_g$ denotes gravity, the mass of the virtual node, the virtual acceleration of gravity, and gravity may be determined to satisfy the equation $F_g = M_n \cdot g_n$. However, this equation is an approximation, and the exemplary embodiments, the mass of the virtual node, the virtual acceleration of gravity, and gravity do not have to have exact values which satisfy the above equation.

In operation S330, the device 1000 may move and display a first node. The first node may be an arbitrary node and may have a location on the screen that is determined according to a location at which a touch input is received. A new location of the first node may be determined based on the resisting force and gravity calculated in operations S310 and S320.

The flowcharts of FIGS. 2 and 3 include moving and displaying a first node. Accordingly, to move and display the first node, all of the touch force, the spring force, and the rod force, which are calculated in the method described with reference to FIG. 2, and the resisting force and gravity, which are calculated in the method described with reference to FIG. 3, may be considered.

Figure 4:
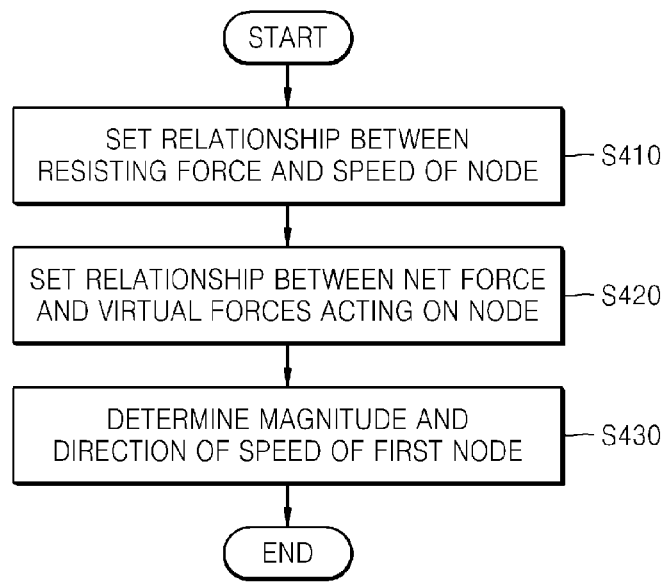
FIG. 4 is a flowchart illustrating a method of displaying a changed shape of a page displayed on a screen of a device by calculating a resisting force and a net force acting on a node and determining a speed and direction of a first node based on the calculated resisting force and net force, according to an embodiment.

FIG. 4 is a flowchart illustrating a method of displaying a changed shape of a page displayed on a screen of the device 1000 by calculating a resisting force and a net force acting on a node and determining a speed and direction of a first node based on the calculated resisting force and net force, according to an embodiment.

In operation S410, the device 1000 calculates a resisting force. Operation S410 may be substantially the same as operation S310. In particular, if it is assumed that $\overline{V}$ denotes a moving speed of a node, $$k_{energy \atop loss}$$

denotes a coefficient of a resisting force, and $\overline{F}_{loss}^{energy}$ denotes the resisting force, the moving speed of the node, the coefficient of the resisting force, and the resisting force may be determined to satisfy the equation $$\overline{F}_{loss}^{energy} = k_{energy \atop loss} \cdot \overline{V} \text{ or } \overline{F}_{loss}^{energy} = k_{energy \atop loss} \cdot \overline{V}^2.$$

However, this equation is an approximation, and in the exemplary embodiments, the resisting force, the moving speed of the node, and the coefficient of the resisting force do not have to have exact values which satisfy the above equation. The coefficient of the resisting force may be set in advance.

In operation S420, the device 1000 calculates a net force acting on a node by obtaining a vector sum of all virtual forces acting on the node.

A moving direction of the node may be determined by the vector sum of all the virtual forces acting on the node. In this case, each of the virtual forces may have the concept of a vector having both a magnitude and a direction. In particular, the moving direction of the node may be determined in an acting direction of the net force that is the vector sum of all the virtual forces acting on the node. The net force may be a vector sum of all the forces acting on a node or may be a resultant force.

If it is assumed that $\overline{F}_{total}$ denotes a net force determined by a vector sum of all virtual forces acting on a corresponding node, t denotes an acting time of the net force, $M_n$ denotes a virtual mass of the corresponding node, $V_0$ denotes an initial speed of the corresponding node, and V denotes a speed after the net force acts on the corresponding node, values of V, $V_0$, $\overline{F}_{total}$, t, and $M_n$ may be determined to satisfy the equation $V=V_0+\overline{F}_{total} \cdot t/M_n$. However, this equation is an approximation, and in the exemplary embodiments, V, $V_0$, $\overline{F}_{total}$, t, and $M_n$ do not have to have values accurately satisfying the above equation.

In addition, $$\sum_{connected \atop springs} \overline{F}_{spring}$$

may denote a vector sum of forces acting on one arbitrary node by all virtual springs connected to the arbitrary node.

In addition, $$\sum_{connected \atop rods} \overline{F}_{rod}$$

may denote a vector sum of forces acting on the arbitrary node by all virtual rods connected to the arbitrary node.

If it is assumed that $\overline{F}_{loss}^{energy}$ denotes the resisting force described above, $\overline{F}_{gravity}$ denotes gravity described above, $\overline{F}_{total}$ denotes the net force described above, and $\overline{F}_{user}$ and denotes the touch force described above from among the virtual forces acting on one arbitrary node, values of $$F_{total}, \sum_{\substack{connected \\ springs}} F_{spring}, \sum_{\substack{connected \\ rods}} F_{rod}, F_{gravity}, F_{loss}^{energy},$$

and $F_{user}$ may be determined to satisfy the equation $$F_{total} = \sum_{\substack{connected \\ springs}} F_{spring} + \sum_{\substack{connected \\ rods}} F_{rod} + F_{gravity} + F_{loss}^{energy} + F_{user}.$$

However, this equation is an approximation, and in the exemplary embodiments, the equation does not have to exact values which satisfy the equation.

A force in the exemplary embodiments may include both a direction and intensity. Thus, a force may be understood with a vector. In addition, regarding a motion of an object in the real world, values such as a force acting on the object, a speed of the object, energy of the object, etc., may satisfy physical laws. Similarly, regarding a motion of a node on a screen, values such as a virtual force acting on the node, a speed of the node, virtual energy of the node, etc., may also be determined in a direction for satisfying physical laws on the motion of the object in the real world. However, each of the values does not have to be exact values which satisfy a physical equation. In other words, each of the values may be determined as an approximate value. In addition, according to circumstances, each of the values may be against physical laws.

In operation S430, the device 1000 determines a speed magnitude and direction of a first node by considering the values determined in operations S410 and S420. An arbitrary node on which $$F_{total}, \sum_{\substack{connected \\ springs}} F_{spring}, \sum_{\substack{connected \\ rods}} F_{rod}, F_{gravity}, F_{loss}^{energy}, F_{user},$$

etc. may be the first node.

Some of the net force acting on the first node may act on neighboring nodes that are adjacent to the first node. In particular, a force, corresponding to a predetermined percentage of the net force acting on the first node, may act on nodes that are directly adjacent to the first node. The force acting on the neighboring nodes of the first node by the first node may act in the same direction as the net force acting on the first node. Alternatively, a virtual force may act on the first node and the neighboring nodes by virtual forces transferred through virtual springs and virtual rods connected to the neighboring nodes of the first node.

In addition, some of the touch force, the spring forces, and the rod forces acting on the first node may act on the neighboring nodes that are adjacent to the first node.

An operation of checking whether a computation end condition is satisfied may be additionally performed when moving and displaying the first node in the method of FIG. 3 or determining a speed magnitude and direction of the first node in the method of FIG. 4. In the operation of checking the computation end condition, e.g., it may be checked whether each variable has a right value, or it may be checked whether the user input has ended. In this case, if the computation end condition is satisfied, one computation ends by moving and displaying the first node or determining a speed magnitude and direction of the first node. Otherwise, the computation process may be repeated from the first operation.

Figure 5:
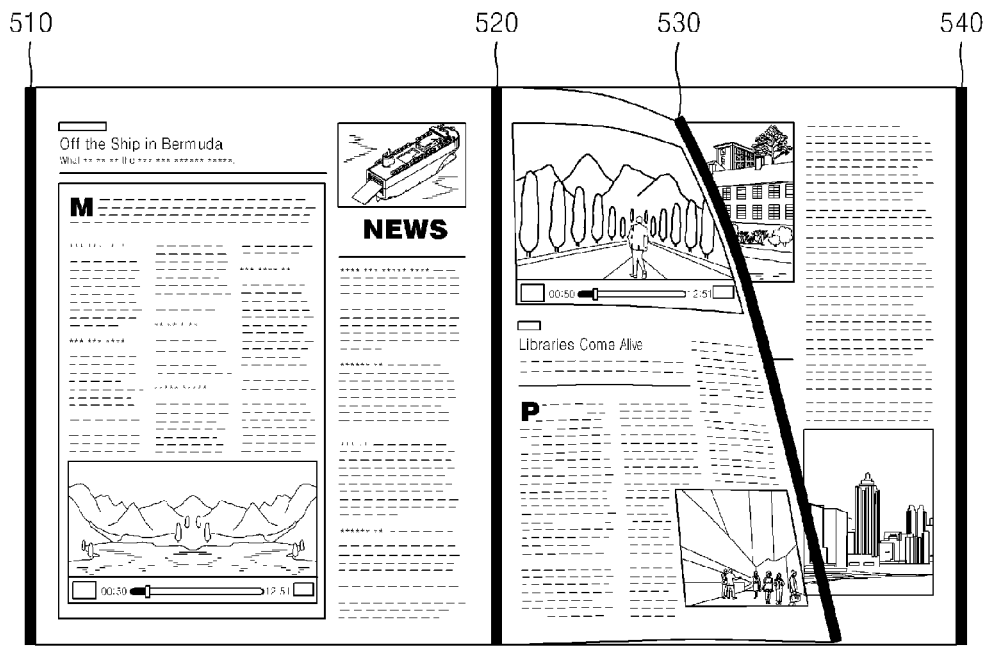
FIG. 5 illustrates a page turn-over vertical axis and page movement vertical lines when a shape of a page is changed and displayed, according to an embodiment.

FIG. 5 illustrates the page turn-over vertical axis 520 and the page movement vertical lines 510, 530, and 540 when a shape of a page is changed and displayed, according to an embodiment. The page turn-over vertical axis 520 may not move even when an image of turning over a page is provided. However, when an image of turning over a page is provided, the page movement vertical line 530 may move. A detailed motion of the page movement vertical line 520 may vary according to a touch input, a touch pressure, a touch force, a touch direction, a touch speed, a moving distance of a touched part, etc.

Figure 6:
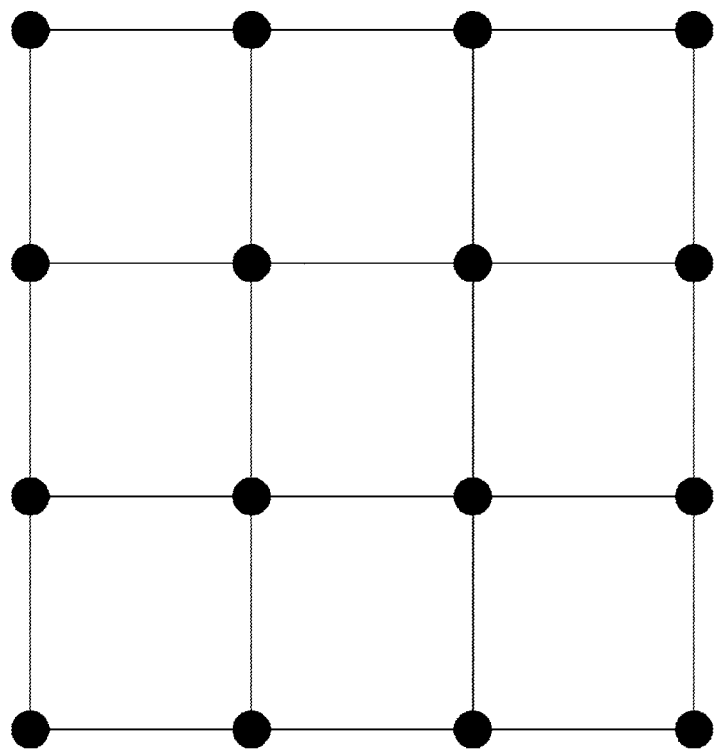
FIG. 6 is a diagram for describing nodes set on a page, according to an embodiment.

FIG. 6 is a diagram for describing nodes set on a page, according to an embodiment. As shown in the current embodiment, the page may be segmented into a plurality of rectangles, the rectangles may be disposed to cover the entire surface of the page without overlapping each other, and a node may be located at each of the apexes of the rectangles.

In addition, the page may be identified by a plurality of rectangles which do not overlap each other, and one of the apexes of the rectangles may be a first node.

In addition, according to another embodiment, the page may include a plurality of polygons. In this case, the plurality of polygons may not cover the entire surface of the page, and the plurality of polygons may overlap each other.

Figure 7:
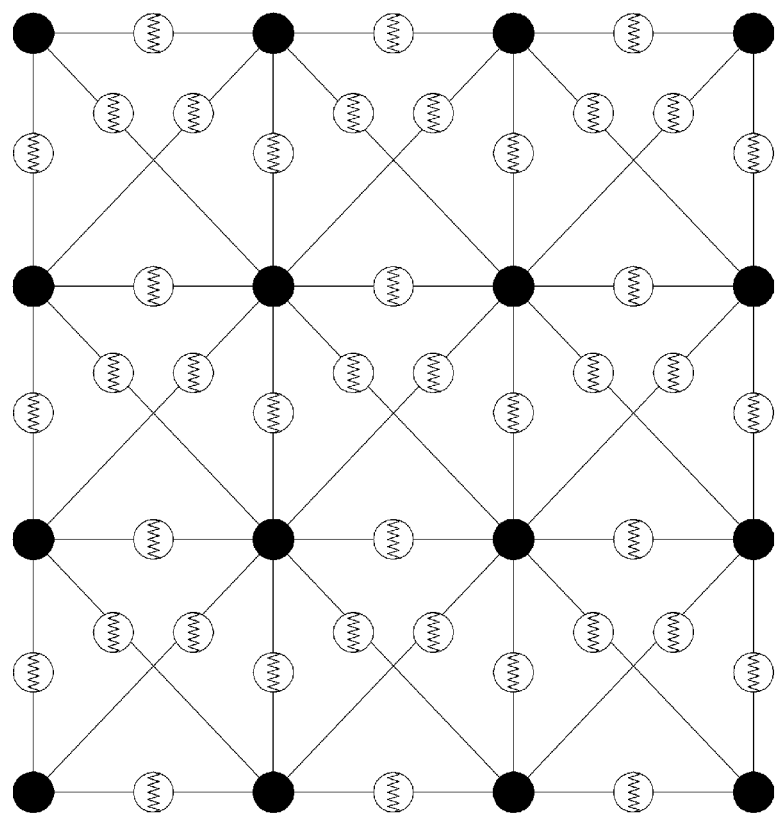
FIG. 7 is a diagram for describing spring forces acting on nodes, according to an embodiment.

FIG. 7 is a diagram for describing spring forces acting on nodes, according to an embodiment.

A virtual spring may be located between every two neighboring nodes, and a spring force may act between the two neighboring nodes to which the virtual spring is connected. The spring force may indicate a virtual force acting in a direction for maintaining a constant distance between the two neighboring nodes to which the virtual spring is connected. Although the virtual spring on a screen acts to display the two neighboring nodes on the screen by maintaining the constant distance between the two neighboring nodes, the distance is not always constant. However, a tendency that the distance between the two neighboring nodes to which the virtual spring is connected is maintained constant may be shown.

Figure 8:
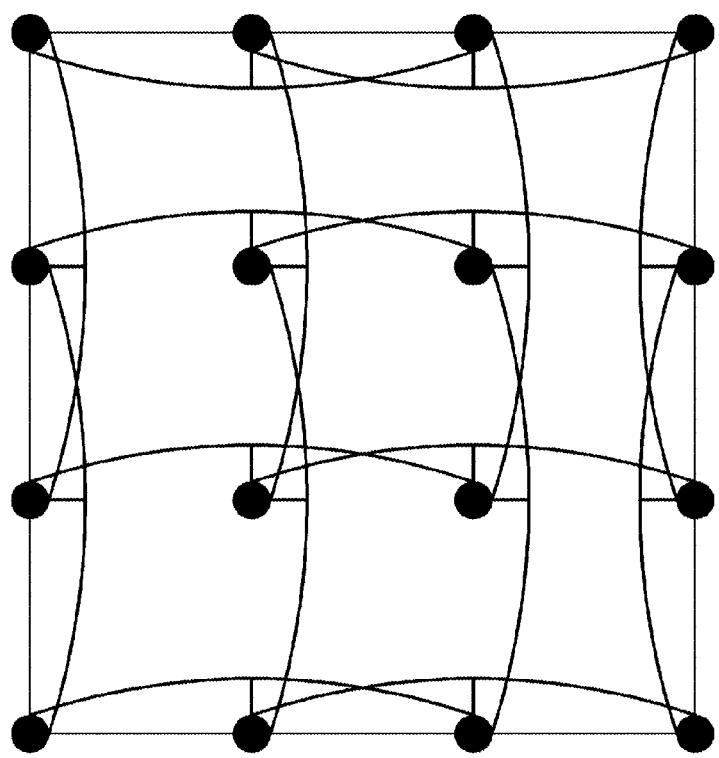
FIG. 8 is a diagram for describing rod forces acting on nodes, according to an embodiment.

FIG. 8 is a diagram for describing rod forces acting on nodes, according to an embodiment.

When three or more rods are adjacently arranged, a rod force may act in a direction for maintaining a state where the three or more rods are initially arranged. In particular, the rod force may act in a direction where a virtual rod is not bent. The rod force is also an element for determining locations of the three or more rods on a screen with a virtual force. When the virtual rod has a direct line shape, if the virtual force acts in a direction of a perpendicular line at a certain point on the virtual rod, the rod force may act in an opposite direction.

The virtual rod may be located in a vertical direction or a horizontal direction. Alternatively, the virtual rod may be located in an angled direction instead of the vertical or horizontal direction. A rod located in the vertical direction may be called a vertical rod, and a rod located in the horizontal direction may be called a horizontal rod. The vertical rod may be virtually connected to three or more adjacent rods in the vertical direction. The horizontal rod may be virtually connected to three or more adjacent rods in the horizontal direction.

Figure 9:
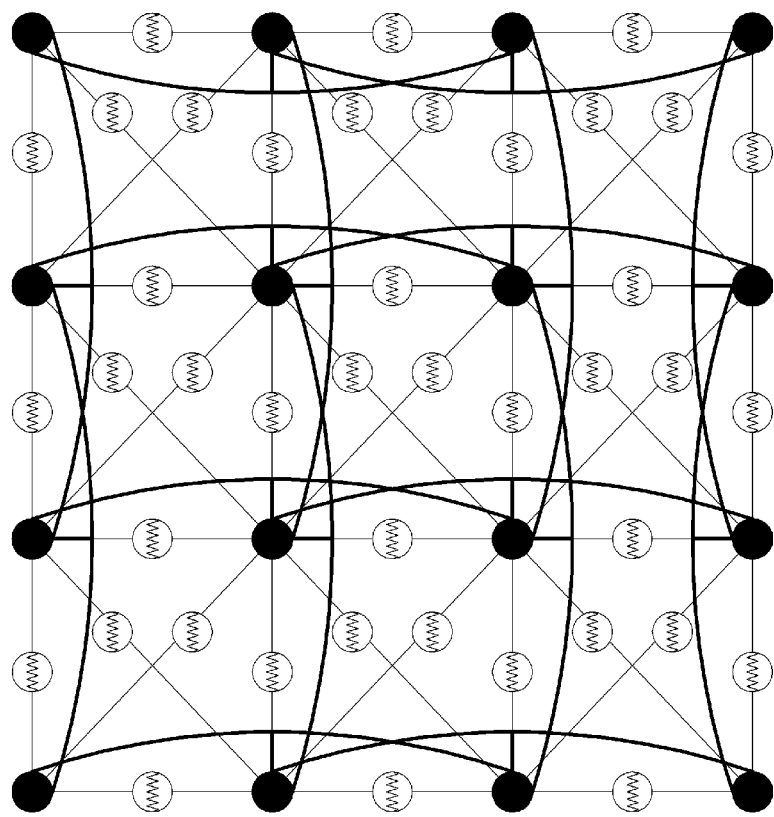
FIG. 9 is a diagram for describing spring forces and rod forces acting on nodes, according to an embodiment.

FIG. 9 is a diagram for describing spring forces and rod forces acting on nodes, according to an embodiment. All of the spring forces and the rod forces may be considered as the concept of a vector having a magnitude and a direction. Thus, a virtual force may act in a direction of a force added as a vector sum of the spring forces and the rod forces.

In addition, a moving speed of a first node connected to virtual springs and virtual rods may decrease according to time by spring forces due to the virtual springs and rod forces due to the virtual rods.

Figure 10:
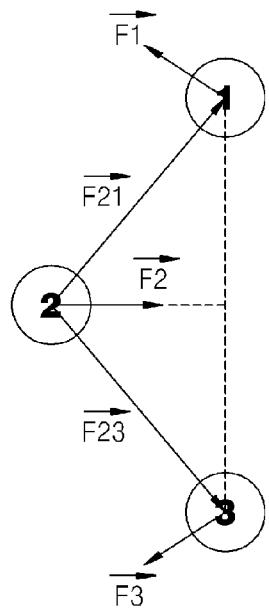
FIG. 10 is a diagram for describing a rod force acting on nodes in more detail, according to an embodiment.

FIG. 10 is a diagram for describing a rod force acting on nodes in more detail, according to an embodiment.

In the description with reference to FIG. 10, all of F1, F2, F3, F21, and F23 are vectors. In addition, F1N is a unit vector of F1, F2N is a unit vector of F2, F3N is a unit vector of F3, F21N is a unit vector of F21, and F23N is a unit vector of F23.

In particular, FIG. 10 illustrates an embodiment of a case where a node 1, a node 2, and a node 3 are initially arranged in a direct line shape, and a virtual rod having a direct line shape is connected to the node 1, the node 2, and the node 3. When the node 1, the node 2, and the node 3 do not have a direct line shape since a virtual force acts on the node 1, the node 2, and the node 3, which were initially arranged in a direct line shape, a rod force may act on the node 1, the node 2, and the node 3 to recover the direct line shape of the node 1, the node 2, and the node 3. Thus, the rod force may act on the node 1, the node 2, and the node 3 in a direction for forcing the node 1, the node 2, and the node 3 to be located in direct line.

As one embodiment wherein the rod force acts on the node 1, the node 2, and the node 3, F21 may act on the node 2 in a direction from the node 2 to the node 1, and F23 may act on the node 2 in a direction from the node 2 to the node 3. In this case, F1, that is determined by F21 and F23, may act on the node 1, and F3, determined by F21 and F23, may act on the node 3.

If it is assumed that 'x' denotes a cross product of two vectors, '*' denotes a scalar product, '||' denotes an absolute value (a vector length), and k denotes a coefficient of a virtual rod. F1, F2, F3, F21, F23, and k may be determined to satisfy the equations F2N=(F23+F21)/|F23+F21|, |F2|=|F23×F21|*k, F1N=((F23×F21)×F21)/|(F23×F21)×F21|, |F1|=|F23×F21|*k*0.5, F3N=(F23×(F23×F21))/|F23×(F23×F21)|, and |F3|=|F23×F21|*k*0.5. However, these equations are only illustrative, and may be approximations. In the exemplary embodiments, F1, F2, F3, F21, F23, and k do not have to have exact values which satisfy the above equations.

Figure 11:
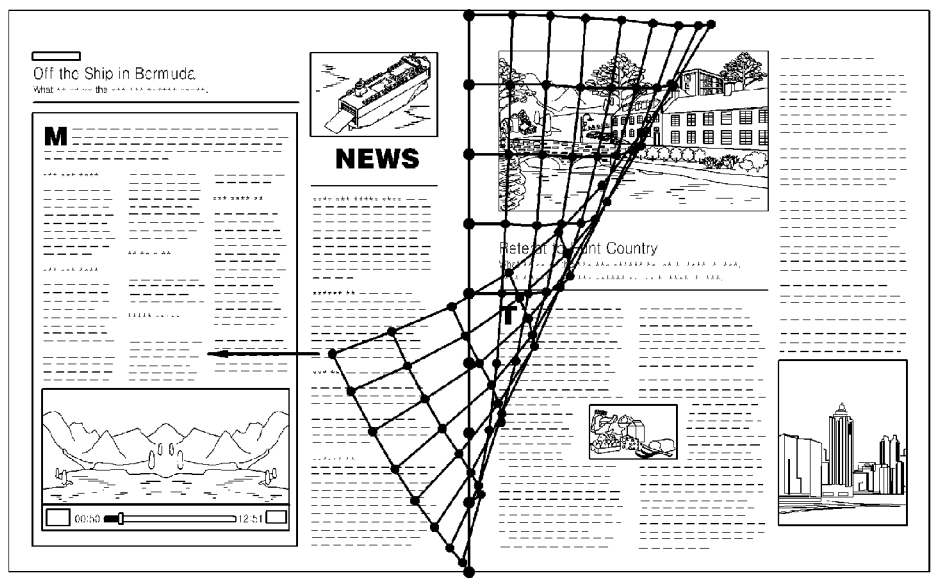
FIG. 11 is a diagram for describing, through nodes on a page, how to display a changed shape of a page displayed on a screen of a device, according to an embodiment.

FIG. 11 is a diagram for describing, through nodes on a page, how to display a changed shape of the page displayed on a screen of the device 1000, according to an embodiment.

A user touch signal can be input at any location of a page. In addition, a different changed screen may be provided according to a change in a touch input, a touch pressure, a touch force, a touch direction, a touch speed, a moving distance of a touched part, etc. In this case, a moving speed, a moving direction, a moving distance, etc., of each of the nodes may be determined according to a touch input, a touch pressure, a touch force, a touch direction, a touch speed, a moving distance of a touched part, etc. Accordingly, an image effect may be provided as if an actual page was turned over. In addition, at this time, a spring force, a rod force, a touch force, etc., acting on each of the nodes may be considered. In addition, according to circumstances, different image effects may be provided as if an actual page was turned over.

FIGS. 12A to 15B illustrate detailed methods of displaying a changed shape of a page according to a user touch input, according to embodiments. In particular, the user touch input may be a continuous motion of one or more touches. In this case, the touch input may be represented as a vector.

In FIGS. 12A to 15B, it is assumed that a page is located in a space having x-, y-, and z-axes. In addition, it is assumed that the x axis is horizontal, the y axis is vertical, and the z axis is orthogonal to an x-y plane. In addition, a right direction of the y axis may be a direction where an x value increases, an up direction of the x axis may be a direction where a y value increases, and the z axis may be in a cross-product direction of a unit vector having an x-axis direction and a unit vector having a y-axis direction.

In addition, the y axis may match a page turn-over vertical axis. In addition, the origin may meet the lower end point of the page turn-over vertical axis.

Figure 12A:
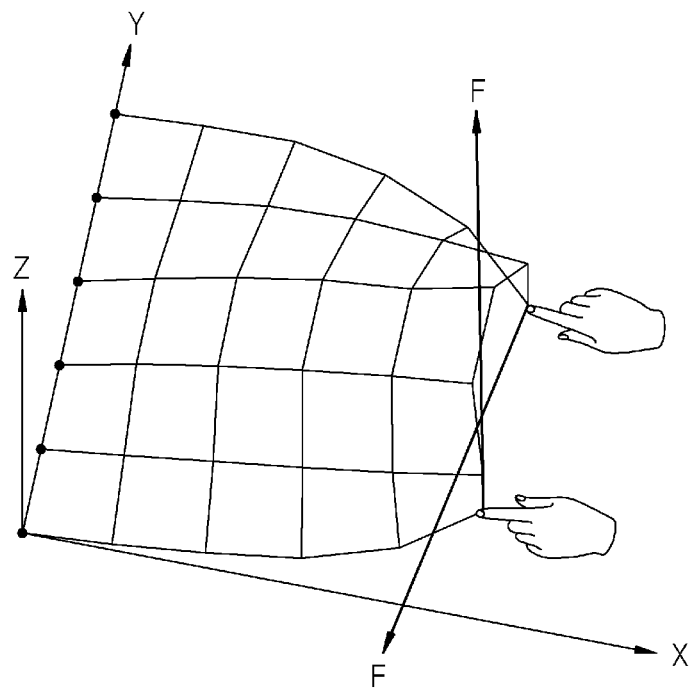
FIGS. 12A and 12B illustrate displaying a changed shape of a page in various ways according to two touch inputs of a user, according to an embodiment.
Figure 12B:
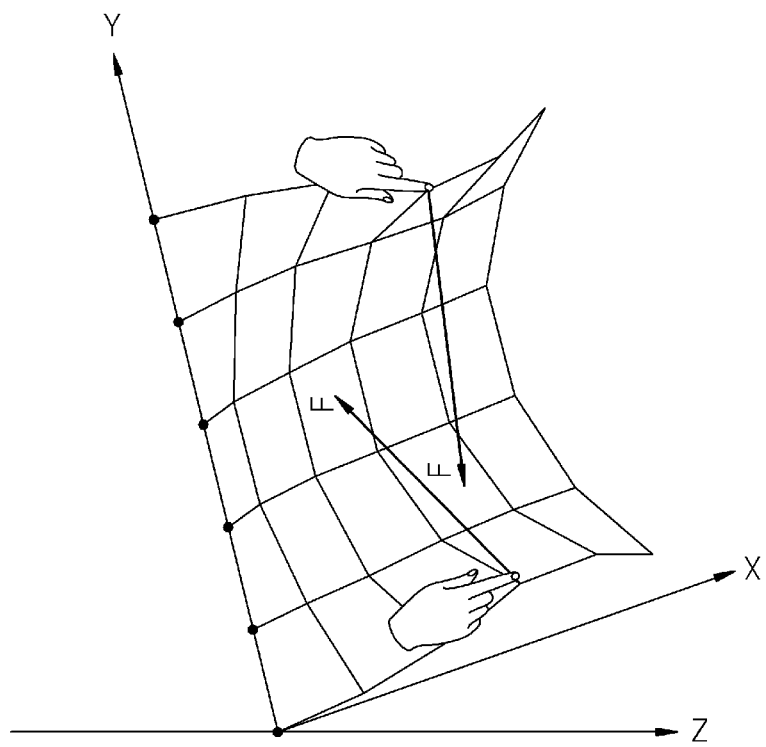

FIGS. 12A and 12B illustrate displaying a changed shape of a page in various ways according to two touch inputs of a user, according to an embodiment.

In FIG. 12A, directions of the two touch inputs may be directions of approaching the page turn-over vertical axis. In addition, the directions of the two touch inputs may be directions where the two touch inputs approach each other. In addition, the two touch inputs may be located at both ends of a page movement vertical line. In this case, nodes at which the two touch inputs are input may move together in directions where locations of the two touch inputs vary. In addition, the device 1000 may change a shape of the page to be completely concave or convex, and display the page. At the same time, the device 1000 may change the shape of the page to be completely turned over, and display the page.

In FIG. 12B, directions of the two touch inputs may be directions of approaching the page turn-over vertical axis. In addition, the directions of the two touch inputs may be directions where the two touch inputs approach each other. In addition, the two touch inputs may be located at locations that are closer to a page movement vertical line than the page turn-over vertical axis. The two touch inputs may not be located on the page movement vertical line. In this case, nodes at which the two touch inputs are input may move together in directions where locations of the two touch inputs vary. In addition, the device 1000 may change a shape of the page to be completely concave or convex, and display the page. At the same time, the device 1000 may change the shape of the page to be completely turned over, and display the page.

Figure 13A:
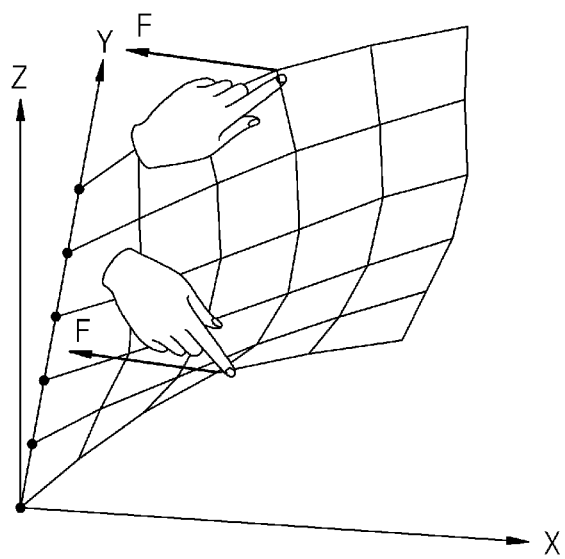
FIGS. 13A and 13B illustrate displaying a changed shape of a page in various ways according to two touch inputs of a user, according to an embodiment.
Figure 13B:
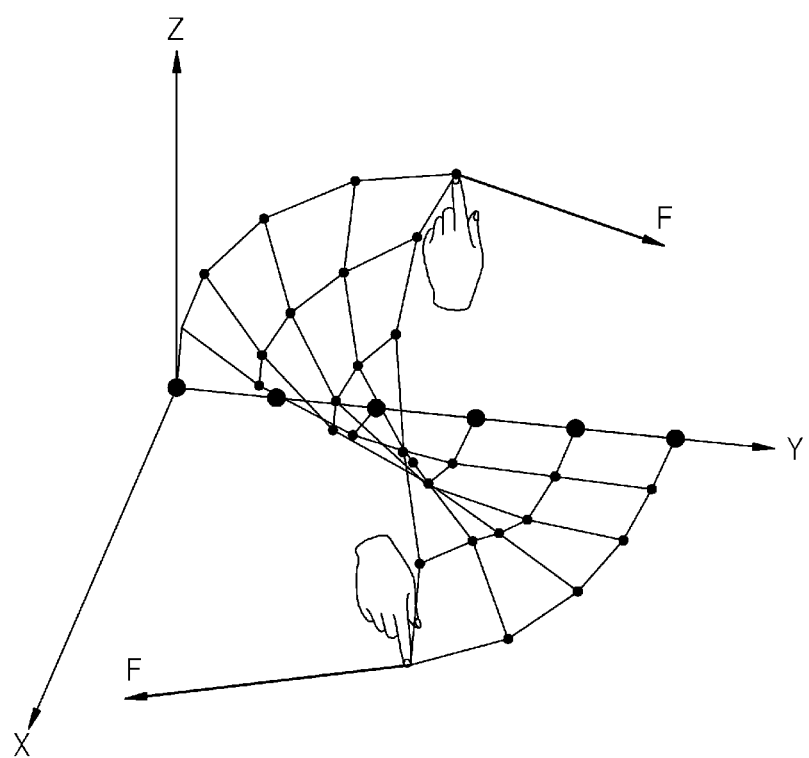

FIGS. 13A and 13B illustrate displaying a changed shape of a page in various ways according to two touch inputs of a user, according to an embodiment.

In FIG. 13A, directions of the two touch inputs may be directions of approaching the page turn-over vertical axis. In addition, the directions of the two touch inputs may be relatively parallel to each other. In addition, a line connecting locations of the two touch inputs may be relatively parallel to the page turn-over vertical axis. In this case, nodes at which the two touch inputs are input may move together in directions where the locations of the two touch inputs vary. At the same time, the device 1000 may change a shape of the page to be completely turned over, and display the page. At this time, when a distance between the locations of the two touch inputs is shorter than a vertical length of the page, the device 1000 may change the shape of the page to be completely concave or convex, and display the page.

In FIG. 13B, directions of the two touch inputs may be directions that are relatively parallel to the page turn-over vertical axis. In addition, the directions of the two touch inputs may be relatively parallel to each other. In addition, a distance between locations of the two touch inputs may be relatively constant and maintained. In addition, the two touch inputs may be located at locations that are closer to a page movement vertical line than the page turn-over vertical axis. In this case, nodes at which the two touch inputs are input may move together in directions where the locations of the two touch inputs vary. At the same time, the device 1000 may change a shape of the page such that the page movement vertical line rotates, and the page is displayed.

Figure 14A:
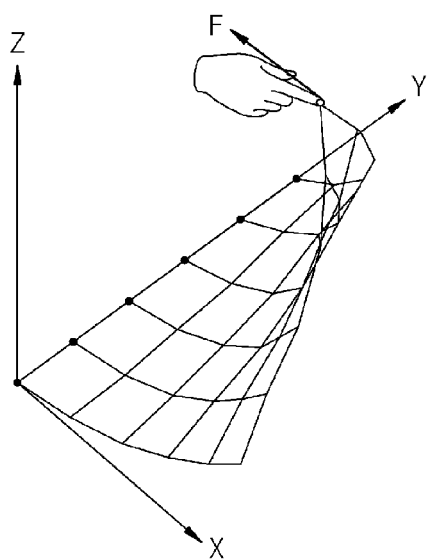
FIGS. 14A to 14C illustrate displaying a changed shape of a page in various ways according to one touch input of a user, according to an embodiment.
Figure 14B:
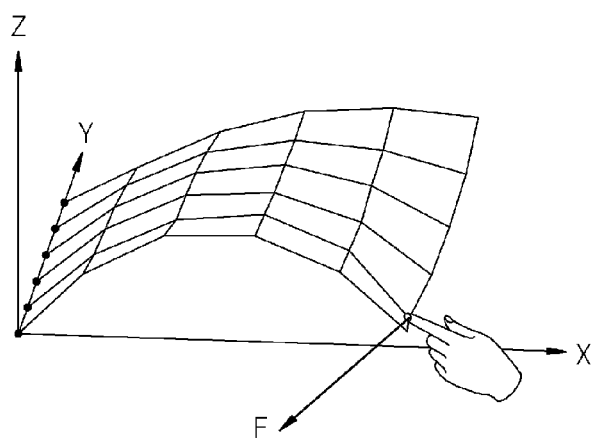
Figure 14C:
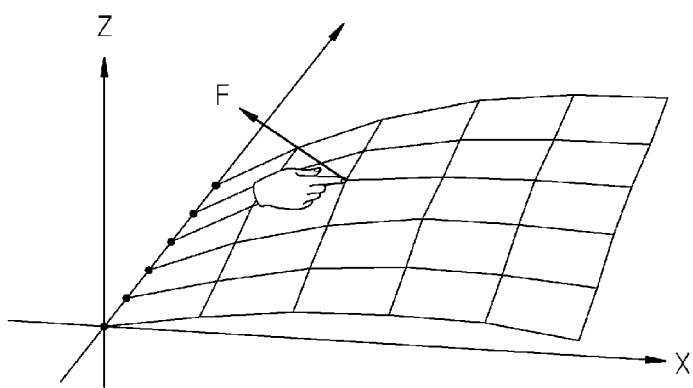

FIGS. 14A to 14C illustrate displaying a changed shape of a page in various ways according to one touch input of a user, according to an embodiment.

FIG. 14A illustrates an embodiment wherein the device 1000 displays a changed shape of a page when a touch input is at a location that is close to the page turn-over vertical axis of the page. In this case, a direction of the touch input may be a direction of approaching a y-z plane. In addition, the direction of the touch input may be a direction that is relatively parallel to the x axis. In addition, the touch input may be located within a range having a positive z value. In this case, a node at which the touch input is input may move in a direction where the location of the touch input varies. At the same time, the device 1000 may change a shape of the page to be completely turned over, and display the page.

FIG. 14B illustrates an embodiment wherein the device 1000 displays a changed shape of a page when a touch input is at a location that is relatively close to the page turn-over vertical axis of the page. In this case, a direction of the touch input may be a direction where an x value and a z value decrease and a y value does not vary that much. In this case, a node at which the touch input is input may move in a direction where a location of the touch input varies. At the same time, the device 1000 may change a shape of the page to be completely turned over, and display the page. In addition, the device 1000 may change the shape of the page to be completely concave or convex, and display the page.

FIG. 14C illustrates an embodiment wherein the device 1000 displays a changed shape of a page when a touch input is at a location that is relatively close to the center of the page. In this case, a direction of the touch input may be a direction where an x value decreases, a z value increases, and a y value does not vary that much. In this case, a node at which the touch input is input may move in a direction where a location of the touch input varies. At the same time, the device 1000 may change a shape of the page to be completely turned over, and display the page. In addition, the device 1000 may change the shape of the page to be completely concave or convex, and display the page.

Figure 15A:
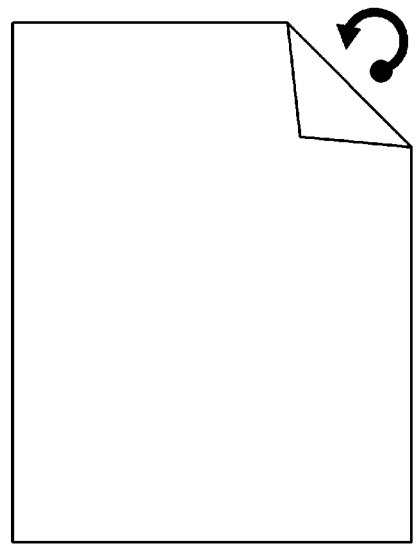
FIGS. 15A and 15B illustrate displaying a changed shape of a page when a user's touch input acts on a corner of the page, according to an embodiment.
Figure 15B:
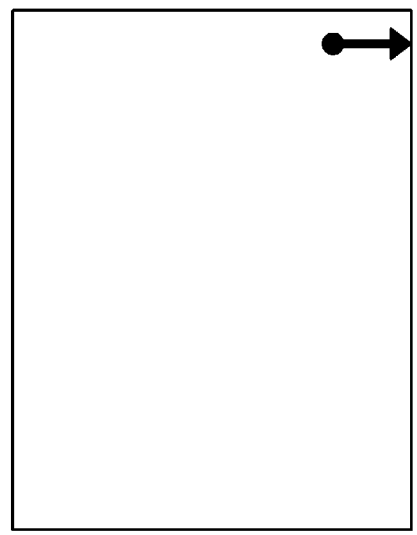

FIGS. 15A and 15B illustrate displaying, by the device 1000, a changed shape of a page when a user touch input acts on a corner of the page, according to an embodiment.

FIG. 15A illustrates an embodiment wherein the device 1000 displays a changed shape of a page so that a corner of the page is folded when a touch input of a user is at the corner of the page.

The touch input may move on an x-y plane and may have a shape similar to a circle. In this case, the device 1000 may change a shape of the page so that a corner of the page is folded, and display the page. At this time, the device 1000 may change the shape of the page to be turned over according to a next touch input in a state where the page is folded. In addition, when the page is displayed on a screen again, the device 1000 may provide a changed shape of the page in the state where the page is folded.

FIG. 15B illustrates an embodiment wherein the device 1000 displays a changed shape of a page so that a folded corner of the page is unfolded when a touch input of a user is at the corner of the page.

The touch input may move on an x-y plane and may have a shape similar to a direct line. In this case, the device 1000 may change a shape of the page so that a folded corner of the page is unfolded, and display the page. At this time, the device 1000 may change the shape of the page to be turned over according to a next touch input in a state where the page is unfolded. In addition, when the page is displayed on a screen again, the device 1000 may provide a changed shape of the page in the state where the page is unfolded.

Figure 16:
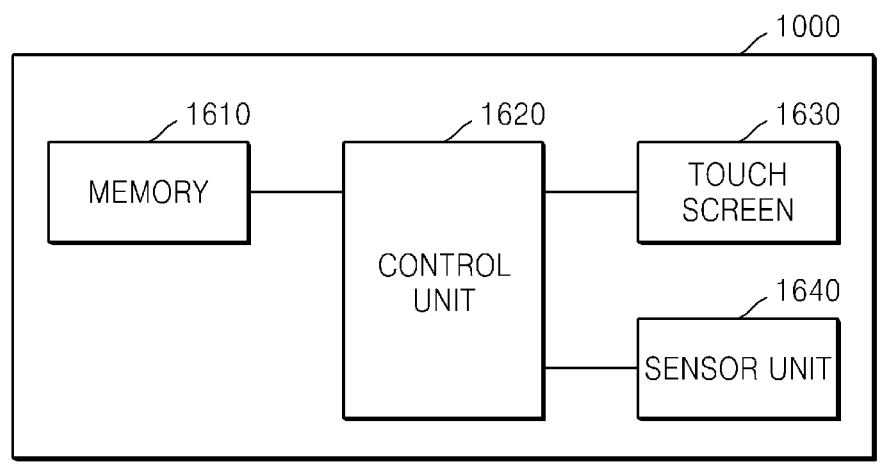
FIG. 16 is a block diagram of a device for displaying a changed shape of a page, according to an embodiment.

A detailed configuration of the device 1000 will now be described with reference to FIG. 16. FIG. 16 is a block diagram of the device 1000 for displaying a changed shape of a page, according to an embodiment.

As shown in FIG. 16, the device 1000 that is an apparatus for providing a page turn-over screen may include a memory 1610, a control unit 1620, a touch screen 1630, and a sensor unit 1640. The device 1000 may be a smartphone, a cellular phone, a personal digital assistant (PDA), a laptop computer, a media player, a global positioning system (GPS) device, or other mobile or non-mobile devices. However, one or more embodiments are not limited thereto, and the device 1000 may include any device providing a display screen.

The memory 1610 may store data for displaying a changed setting state or shape of a current page. In more detail, the memory 1610 may store a resisting force, gravity, a touch force, a spring force, a rod force, a moving speed of each node, a location of each node, a virtual force acting on each node, a location of a touch input, a touch direction, a touch speed, a touch pressure, a moving distance of a touched part, a location of a page turn-over vertical axis, a location of a page movement vertical line, an elastic coefficient of a virtual spring, an elastic coefficient of a virtual rod, a coefficient of the resisting force, a virtual mass of each node, a virtual acceleration of gravity, an initial speed of each node, a net force of each node, etc.

The control unit 1620 may control the entire screen by receiving information stored in the memory 1610 from the memory 1610, receiving a signal input from the touch screen 1630, and receiving related information from the sensor unit 1640. In addition, the control unit 1620 may control operations of the memory 1610, the touch screen 1630, and the sensor unit 1640 according to each input circumstance.

In addition, the control unit 1620 may determine each of the values described above. In particular, the control unit 1620 may determine a resisting force, gravity, a touch force, a spring force, a rod force, a moving speed of each node, a location of each node, a virtual force acting on each node, a location of a touch input, a touch direction, a touch speed, a touch pressure, a moving distance of a touched part, a location of a page turn-over vertical axis, a location of a page movement vertical line, an elastic coefficient of a virtual spring, an elastic coefficient of a virtual rod, a coefficient of the resisting force, a virtual mass of each node, a virtual acceleration of gravity, an initial speed of each node, a net force of each node, etc.

In addition, the control unit 1620 may determine the values so that the equations described above are satisfied.

In detail, when one arbitrary virtual spring is connected to two nodes, it may be considered that $F_{spring}$ denotes a spring force, $k_{spring}$ denotes an elastic coefficient of a virtual spring, $\Delta x$ denotes an amount of change in a length of the virtual spring, $x_{current}$ denotes a current length of the virtual spring, and $x_0$ denotes a length of the virtual spring in a state where no force is applied. In this case, the control unit 1620 may determine the values so that the equation $F_{spring}=k_{spring}\cdot\Delta x=k_{spring}\cdot(x_{current}-x_0)$ is satisfied.

When it is assumed that $\overline{V}$ denotes a moving speed of a node, $$k_{energy \atop loss}$$

denotes a coefficient of a resisting force, and $\overline{F}_{loss}^{energy}$ denotes the resisting force, the control unit 1620 may determine the moving speed of the node, the coefficient of the resisting force, and the resisting force so that the equation $$\overline{F}_{loss}^{energy} = k_{energy \atop loss}\cdot \overline{V} \text{ or } \overline{F}_{loss}^{energy} = k_{energy \atop loss}\cdot \overline{V}^2$$

is satisfied.

When it is assumed that $\overline{F}_{total}$ denotes a net force determined by a vector sum of all virtual forces acting on a corresponding node, t denotes an acting time of the net force, $M_n$ denotes a virtual mass of the corresponding node, $V_0$ denotes an initial speed of the corresponding node, and V denotes a speed after the net force acts on the corresponding node, the control unit 1620 may determine values of V, $V_0$, $\overline{F}_{total}$, t, and $M_n$ so that the equation $V=V_0+\overline{F}_{total}\cdot t/M_n$ is satisfied.

When it is assumed that $$\sum_{connected \atop springs} \overline{F}_{spring}$$

denotes a vector sum of forces acting on one arbitrary node by all virtual springs connected to the arbitrary node, $$\sum_{connected \atop rods} \overline{F}_{rod}$$

denotes a vector sum of forces acting on the arbitrary node by all virtual rods connected to the arbitrary node, and $\overline{F}_{loss}^{energy}$, $\overline{F}_{gravity}$, $\overline{F}_{total}$, and $\overline{F}_{user}$ respectively denote a resisting force, gravity, a net force, and a touch force from among virtual forces acting on the arbitrary node, the control unit 1620 may determine values of $$\overline{F}_{total}, \sum_{connected \atop springs} \overline{F}_{spring}, \sum_{connected \atop rods} \overline{F}_{rod}, \overline{F}_{gravity}, \overline{F}_{loss}^{energy},$$

and $\overline{F}_{user}$ so that the equation $$\overline{F}_{total} = \sum_{connected \atop springs} \overline{F}_{spring} + \sum_{connected \atop rods} \overline{F}_{rod} + \overline{F}_{gravity} + \overline{F}_{loss}^{energy} + \overline{F}_{user}$$

is satisfied.

However, these equations may be approximations, and the equations do not have to be satisfied in the exemplary embodiments. The control unit 1620 may preset coefficients, such as a coefficient of a resisting force, an elastic coefficient of a virtual spring, an elastic coefficient of a virtual rod, etc. The touch screen 1630 may receive a user input. In particular, when the user approaches the touch screen 1630 with a certain object or a body part of the user within a predetermined distance from the touch screen 1630, the touch screen 1630 may collect information related to the location. The touch screen 1630 may provide a user interface corresponding to various services (e.g., a voice call, data transmission, broadcasting, and photographing) to the user. The touch screen 1630 may transmit an analog signal corresponding to at least one touch input through the user interface to the control unit 1620. The touch screen 1630 may receive at least one touch through a body part of the user (e.g., a finger, including the thumb) or a touchable input means (e.g., a stylus pen). In addition, the touch screen 1630 may receive a continuous motion of one of at least one touch. The touch screen 1630 may transmit an analog signal corresponding to the continuous motion of the input touch to the control unit 1620.

In an exemplary embodiment, the touch is not limited to a contact between the touch screen 1630 and a body part of the user or the touchable input means, and may include a non-contact (e.g., a detectable distance, between the touch screen 1630 and a body part of the user or the touchable input means, is 1 mm or less). The detectable distance by the touch screen 1630 may vary according to the performance or structure of the device 1000.

The touch screen 1630 may be implemented as a resistive method, a capacitive method, an infrared method, or an acoustic wave method.

In addition, the touch screen 1630 may display a screen. At this time, the touch screen 1630 may display a changed shape of a page according to a touch input. When the device 1000 displays a changed shape of a page, the shape of the page may be more smoothly displayed according to a predetermined criterion. In particular, the device 1000 may display a changed shape of a page in a shape of a curved surface connecting nodes. Curves forming the curved surface may be Bezier curves.

The sensor unit 1640 may detect the intensity of a touch input, a strength of a change in a location of the touch input, and a change in the touch input. The sensor unit 1640 may transmit such information to the control unit 1620. Values of gravity, etc., may be calculated based on the information. In more particular, the sensor unit 1640 may include an accelerometer, a gyroscope, a front camera, and a rear camera. All pieces of information that are measurable by the five human senses, such as wind, may be measured using the sensor unit 1640.

Figure 17:
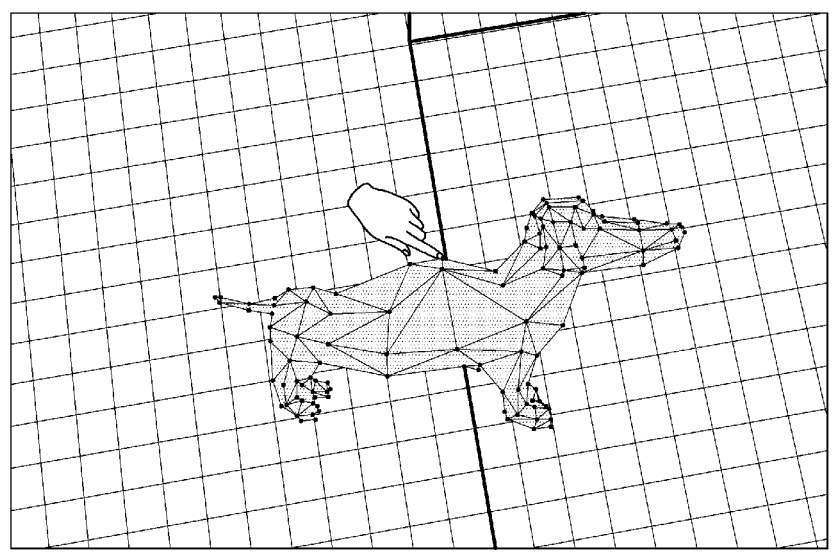
FIG. 17 illustrates a case where a page is changed and displayed in a three-dimensional image, according to an embodiment.

FIG. 17 illustrates a case where a page is changed and displayed as a three-dimensional image, according to an embodiment.

In particular, a three-dimensional image may be displayed in a page, and a plurality of nodes may be set in the three-dimensional image. In addition, the plurality of nodes in the three-dimensional image may move according to a user input on the three-dimensional image. Accordingly, a shape of the three-dimensional image may be changed and returned to its original shape.

Exemplary embodiments may be applicable to one dimension, such as a line, and three dimensions involving volume, in addition to two dimensions corresponding to a surface.

Exemplary embodiments may be implemented in a form of a recording medium including computer-executable instructions, such as computer-executable program modules. A computer-readable recording medium may be an arbitrary available medium, which is accessible by a computer, and includes all of volatile and nonvolatile media and detachable and undetachable media. In addition, the computer-readable recording medium may include both a computer storage medium and a communication medium. The computer storage medium includes all of volatile and nonvolatile and detachable and undetachable media that are implemented by an arbitrary method or technique for storing information, such as computer-readable instructions, a data structure, program modules, or other data. The communication medium typically includes computer-readable instructions, a data structure, program modules, other data of a modulated data signal, such as a carrier, or other transmission mechanisms and includes an arbitrary information transfer medium.

The above description is only illustrative, and it will be understood by one of ordinary skill in the art that various changes in form and details may be made therein without changing the technical spirit and mandatory features of the exemplary embodiments. Therefore, the embodiments should be understood in the illustrative sense only and not for the purpose of limitation in all aspects. For example, each component described in a singular type may be carried out by being distributed. Further, components described in a distributed fashion may be carried out in a combined type.

It should be understood that the exemplary embodiments described therein should be considered in a descriptive sense only and not for purposes of limitation. Descriptions of features or aspects within each embodiment should typically be considered as available for other similar features or aspects in other embodiments.

While exemplary embodiments have been described with reference to the figures, it will be understood by those of ordinary skill in the art that various changes in form and details may be made therein without departing from the spirit and scope of the exemplary embodiments as defined by the following claims.

What is claimed is:

1. A method of displaying a changed shape of a page displayed on a screen of a device for simulating page turning, the method comprising:
   receiving a user touch input on a first node of the page;
   obtaining components of the user touch input, wherein the components comprise a touch pressure, a moving direction, a moving speed, and a moving distance of the user touch input;
   obtaining a relationship between the first node and one or more second nodes adjacent to the first node; and
   displaying the changed shape of the page for simulating the page turning on the screen by displaying the first node whose position is updated based on the obtained components and relationship.

2. The method of claim 1, wherein the obtaining the relationship comprises:
   calculating a virtual touch force which acts on the first node based on the components;
   calculating a virtual spring force which acts on the first node by at least one virtual spring which connects the first node to the one or more second nodes based on the calculated virtual touch force;
   calculating a virtual rod force which acts on the first node by at least one virtual rod which connects the first node to the one or more second nodes based on the calculated virtual touch force; and
   obtaining the relationship based on the virtual touch force, the virtual spring force, and the virtual rod force.

3. The method of claim 2, further comprising: calculating virtual gravity which acts on the first node, wherein the displaying the changed shape of the page on the screen comprises updating the position of the first node based on the virtual touch force, the virtual spring force, the virtual rod force, and the virtual gravity.

4. The method of claim 3, further comprising: calculating a virtual resisting force which acts on the first node, wherein the displaying the changed shape of the page on the screen comprises updating the position of the first node based on the virtual touch force, the virtual spring force, the virtual rod force, the virtual gravity, and the virtual resisting force.

5. The method of claim 4, wherein the calculating the virtual resisting force which acts on the first node comprises calculating the virtual resisting force based on a virtual resisting force coefficient and a moving speed of the first node.

6. The method of claim 4, wherein the displaying the changed shape of the page on the screen comprises obtaining a moving direction and a moving speed of the first node based on a sum of the virtual touch force, the virtual spring force, the virtual rod force, the virtual gravity, and the virtual resisting force.

7. The method of claim 2, wherein the virtual spring force is a virtual force which acts on the first node by a plurality of virtual springs which connect the first node to the one or more second nodes.

8. The method of claim 2, wherein a portion of the virtual touch force, the virtual spring force, and the virtual rod force, which act on the first node, also acts on the one or more second nodes.

9. The method of claim 1, wherein a moving speed of the first node decreases according to time.

10. The method of claim 1, wherein the page is segmented into a plurality of rectangles which do not overlap each other, and the first node is one of a plurality of apexes in the rectangles.

11. The method of claim 1,
   wherein the at least one virtual rod comprises at least one selected from a vertical rod and a horizontal rod,
   wherein the vertical rod is virtually connected to the first node and two of the second nodes which are adjacent to the first node in a vertical direction of the page, and
   wherein the horizontal rod is virtually connected to the first node and two of the second nodes which are adjacent to the first node in a horizontal direction of the page.

12. A device for displaying a changed shape of a page displayed on a screen for simulating page turning, the device comprising:
   a touch screen configured to receive at least one touch input of a user on a first node of the page; and
   a processor configured to obtain components of the user touch input, wherein the components comprise a touch pressure, a moving direction, a moving speed, and a moving distance of the user touch input and obtain a relationship between the first node and one or more second nodes adjacent to the first node; and
   a display configured to display the changed shape of the page for simulating the page turning on the screen by displaying the first node whose position is updated based on the obtained components and relationship.

13. The device of claim 12, wherein the processor is further configured to calculate a virtual touch force which acts on the first node based on the components, calculate a virtual spring force which acts on the first node by at least one virtual spring which connects the first node to the one or more second nodes based on the calculated virtual touch force, calculate a virtual rod force which acts on the first node by at least one virtual rod which connects the first node to the one or more second nodes based on the calculated virtual touch force, obtain the relationship based on the virtual touch force, the virtual spring force, and the virtual rod force.

14. The device of claim 13, wherein the processor is further configured to calculate virtual gravity which acts on the first node and update the position of the first node based on the virtual touch force, the virtual spring force, the virtual rod force, and the virtual gravity.

15. The device of claim 14, wherein the processor is further configured to calculate a virtual resisting force which acts on the first node and update of position of the first node based on the virtual touch force, the virtual spring force, the virtual rod force, the virtual gravity, and the virtual resisting force.

16. The device of claim 15, wherein the processor is configured to obtain a moving direction and a moving speed of the first node based on a sum of the virtual touch force, the virtual spring force, the virtual rod force, the virtual gravity, and the virtual resisting force.

17. The device of claim 15, wherein the processor is configured to calculate the virtual resisting force based on a virtual resisting force coefficient and a moving speed of the first node in response to the virtual resisting force which acts on the first node being calculated.

18. The device of claim 15, wherein the processor is further configured to control a portion of the virtual touch force, the virtual spring force, and the virtual rod force, which acts on the first node.

19. The device of claim 13, wherein the processor is further configured to, move the first node based on the virtual touch force, the virtual spring force and the virtual rod force, and decrease the moving speed of the first node according to time due to the virtual spring force and the virtual rod force.

20. The device of claim 13, wherein the page is segmented into a plurality of rectangles which do not overlap each other, and the first node is one of a plurality of apexes in the rectangles.

21. The device of claim 13, wherein the processor is further configured to obtain the virtual spring force by a plurality of virtual springs which connect the first node to the one or more second nodes.

22. The device of claim 13,
wherein the at least one virtual rod comprises at least one selected from a vertical rod and a horizontal rod,
wherein the vertical rod is virtually connected to the first node and two of the second nodes which are adjacent to the first node in a vertical direction of the page, and
wherein the horizontal rod is virtually connected to the first node and two of the second nodes which are adjacent to the first node in a horizontal direction of the page.

23. A non-transitory computer-readable recording medium that stores a program, which, when executed by a computer, performs a page turning simulation comprising:
receiving a user touch input on a first node of the page;
obtaining components of the user touch input, wherein the components comprise a touch pressure, a moving direction, a moving speed, and a moving distance of the user touch input;
obtaining a relationship between the first node and one or more second nodes adjacent to the first node; and
displaying a changed shape of the page on the screen for the page turning simulation by displaying the first node whose position is updated based on the obtained components and relationship.

* * * * *